United States Patent
Kakade et al.

(10) Patent No.: US 10,005,339 B2
(45) Date of Patent: Jun. 26, 2018

(54) VEHICLE THERMAL MANAGEMENT SYSTEM AND CONTROL METHOD FOR THE SAME

(71) Applicant: GM GLOBAL TECHNOLOGY OPERATIONS LLC, Detroit, MI (US)

(72) Inventors: Rupesh S. Kakade, Raigad (IN); Prashant Mer, Rajkot (IN); Vish S. Iyer, Rochester Hills, MI (US); Michael H. Carlson, Madison Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 404 days.

(21) Appl. No.: 14/721,411

(22) Filed: May 26, 2015

(65) Prior Publication Data
US 2016/0347150 A1 Dec. 1, 2016

(51) Int. Cl.
| | |
|---|---|
| *B60H 1/00* | (2006.01) |
| *B60H 1/03* | (2006.01) |
| *F01P 3/02* | (2006.01) |

(52) U.S. Cl.
CPC ......... *B60H 1/00885* (2013.01); *B60H 1/004* (2013.01); *B60H 1/00764* (2013.01); *B60H 1/034* (2013.01); *F01P 3/02* (2013.01); *B60H 2001/00949* (2013.01); *F01P 2060/08* (2013.01)

(58) Field of Classification Search
CPC .............. B60H 1/004; B60H 1/00764; B60H 1/00885; B60H 1/034; B60H 2001/00949; F01P 3/02; F01P 2060/08

USPC .......................................................... 237/5
See application file for complete search history.

(56) References Cited

U.S. PATENT DOCUMENTS

| | | | | |
|---|---|---|---|---|
| 5,174,254 | A | * 12/1992 | Humburg | B60H 1/00485 123/142.5 R |
| 5,860,595 | A | * 1/1999 | Himmelsbach | B60H 1/00314 237/12.3 B |
| 6,178,928 | B1 | * 1/2001 | Corriveau | F01P 7/048 123/41.12 |
| 8,628,025 | B2 | * 1/2014 | Bucknell | F01N 5/02 123/41.21 |

(Continued)

FOREIGN PATENT DOCUMENTS

| | | |
|---|---|---|
| CN | 1666896 A | 9/2005 |
| CN | 201484114 U | 5/2010 |

*Primary Examiner* — Alissa Tompkins
*Assistant Examiner* — John Bargero
(74) *Attorney, Agent, or Firm* — Quinn IP Law

(57) ABSTRACT

A thermal management system includes a coolant pump, high-voltage electric heater (HEH) for heating the coolant, a heater core, a blower directing air to the heater core, a cabin heater valve (CHV), sensors, and a controller. The CHV has an Engine Bypass position blocking coolant flow from the HEH into the engine, and an Engine Link position directing coolant from the HEH into the engine. In a method, the sensors measure engine outlet coolant temperature (ECT), inlet coolant temperature (ICT) to the HEH, inlet air temperature into the heater core, and outlet air temperature from the heater core. The controller calculates a target coolant temperature (TCT) value as a function of the air temperatures and mass flow rates, and controls the CHV via position control signals such that the CHV is switched between the Engine Link position and the Engine Bypass position when ICT equals the calculated TCT value.

18 Claims, 4 Drawing Sheets

(56) References Cited

U.S. PATENT DOCUMENTS

| | | | | |
|---|---|---|---|---|
| 9,618,242 | B2* | 4/2017 | Lombardo | F25B 30/02 |
| 2005/0034473 | A1* | 2/2005 | Casar | B60H 1/00899 |
| | | | | 62/324.1 |
| 2005/0167169 | A1* | 8/2005 | Gering | B60H 1/00278 |
| | | | | 237/12.3 B |
| 2006/0081355 | A1* | 4/2006 | Horstmann | B60H 1/025 |
| | | | | 165/43 |
| 2009/0314847 | A1* | 12/2009 | Nemoto | B60H 1/00764 |
| | | | | 237/5 |
| 2009/0321533 | A1 | 12/2009 | Bigler et al. | |
| 2010/0230505 | A1* | 9/2010 | Ribadeneira | B60H 1/004 |
| | | | | 237/5 |
| 2012/0074238 | A1* | 3/2012 | Morita | F02D 13/0249 |
| | | | | 237/5 |
| 2013/0186351 | A1* | 7/2013 | Quix | F01P 5/10 |
| | | | | 123/41.02 |
| 2014/0097261 | A1* | 4/2014 | Blumenstock | B60H 1/00492 |
| | | | | 237/5 |
| 2014/0158784 | A1* | 6/2014 | Lundberg | F01P 7/14 |
| | | | | 237/5 |
| 2016/0025059 | A1* | 1/2016 | Godsall | F23N 5/022 |
| | | | | 237/5 |
| 2016/0068043 | A1* | 3/2016 | Djermester | B60H 1/03 |
| | | | | 237/5 |
| 2016/0185185 | A1* | 6/2016 | Suzuki | B60H 1/00921 |
| | | | | 237/5 |
| 2016/0195002 | A1* | 7/2016 | Ito | F01P 11/14 |
| | | | | 236/34.5 |

* cited by examiner

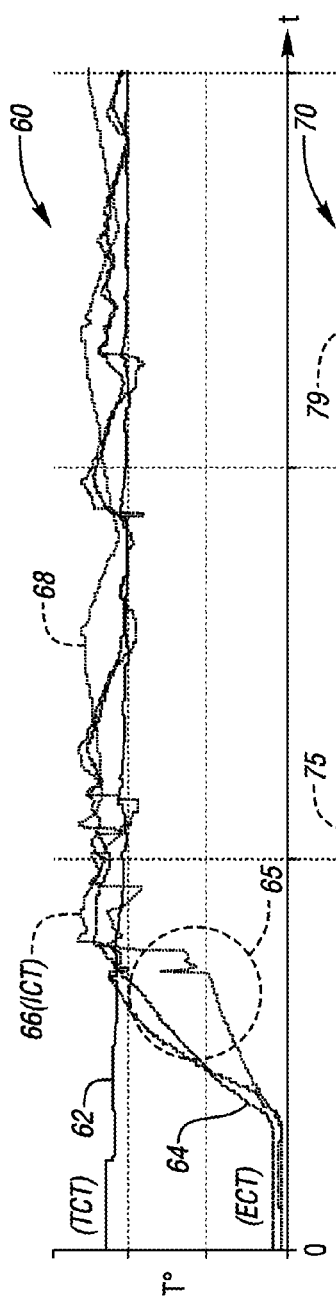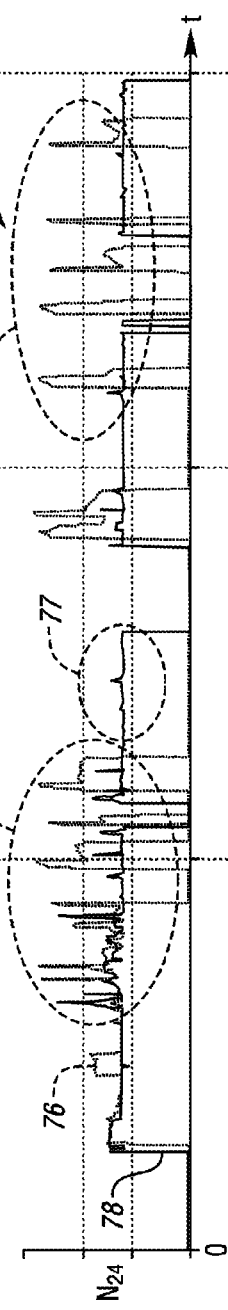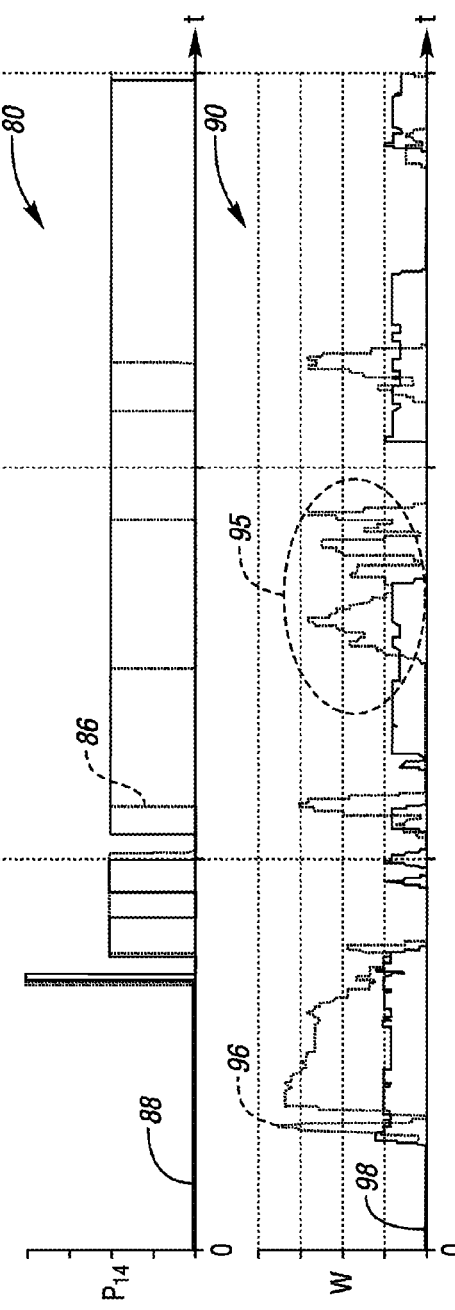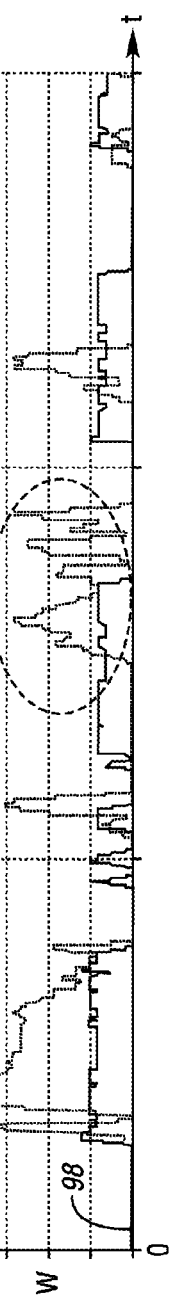
FIG. 3A
FIG. 3B
FIG. 3C
FIG. 3D

US 10,005,339 B2

VEHICLE THERMAL MANAGEMENT SYSTEM AND CONTROL METHOD FOR THE SAME

TECHNICAL FIELD

The present disclosure relates to a vehicle thermal management system and a method for controlling the same.

BACKGROUND

Vehicles having an electric powertrain are propelled using motor torque from one or more electric traction motors. The fraction motors draw electrical energy from a rechargeable energy storage system in electric vehicle (EV) drive modes, and when equipped with an internal combustion engine can selectively regenerate the energy storage system using engine torque as well as regenerative braking. The multiple rows of battery cells in a typical energy storage system generate heat during EV drive operation or when powering onboard electrical systems. As a result, thermal management systems are used to regulate temperature, with a typical thermal management system including various coolant loops through which coolant is circulated via a coolant pump.

Traditionally, a three-way cabin heater valve or CHV is used as part of any thermal management system in order to control the flow of coolant to and from a cabin heater core. Additionally, air is directed through ductwork across the heater core at a level regulated via a motor-driven heater flap. Hybrid and battery electric vehicles also use a high-voltage electric heater (HEH) to supply the necessary cabin heat for passenger comfort at times when engine coolant temperature remains relatively low, for example during extended EV drive modes.

A CHV is ordinarily switched to a first position to fluidly connect the cabin heater core to an engine coolant loop in what is referred to as an Engine Link mode, and to a second position to bypass the engine coolant loop in an Engine Bypass mode, with the latter mode typically used to manage an engine warm-up process. In the Engine Bypass mode, engine waste heat is not readily available for cabin heating and/or there is abundant electric energy available for the HEH to run at a higher output capacity such that fuel consumption and vehicle emissions are minimized. Engine Link mode, on the other hand, allows for utilization of available engine waste heat and enables the engine alone or both the engine and the HEH to supply any required cabin heating.

SUMMARY

A method is disclosed herein for controlling a three-way cabin heater valve (CHV) in a vehicle thermal management system. The method is intended to improve upon the performance of hybrid thermal management systems of the type described generally above, i.e., in vehicle's having an internal combustion engine as part of the powertrain. In addition to the CHV, the thermal management system includes a coolant pump, a cabin heater core, a high-voltage electric heater (HEH), and temperature sensors positioned at a coolant outlet of the engine, a coolant inlet to the HEH, and air inlet/outlet sides of the heater core. The method is executed via a controller in a manner that carefully considers energy balance between engine waste heat and HEH-provided heat when automatically selecting between an Engine Link position and an Engine Bypass position of the CHV.

The method is intended to improve upon existing methods of CHV control and avoid a warm/cold puff of air phenomenon. As is known in the art, such a phenomenon refers to transient circulation of relatively warm or cold air into the passenger cabin. That is, air that is warmer or colder than the present cabin temperature is briefly passed to the passenger cabin due to the relatively slow actuation speed of a heater flap directing air across the cabin heater core. A warm puff of air, for example, may be experienced when the CHV moves to the Engine Link position due to continued circulation of warm engine coolant while the heater flap motor continues to adjust the heater flap position. Excessive opening of the heater flap, even for a short duration, can also lead to overheating of the circulated air, thereby exacerbating the warm/cold puff of air phenomenon.

Similarly, a relatively cold puff of air may be experienced when the CHV moves to the Engine Bypass position during an EV drive mode while the HEH is still warming the coolant and the heater flap motor continues to adjust the heater flap position. Excessive opening of the heater flap, even over a short duration, may lead to such a cold puff of air. The present method and accompanying system are therefore intended to help address this particular performance issue, while also potentially improving overall powertrain energy efficiency.

In a particular embodiment, a thermal management system for a vehicle having an engine includes a pump operable for circulating coolant, a high-voltage electric heater (HEH) in fluid communication with the pump, a heater core in fluid communication with an outlet of the HEH, and a blower which directs air to the heater core. The system also includes a cabin heater valve (CHV) responsive to position control signals, and having an Engine Bypass position which prevents flow of the coolant to the engine and an Engine Link position which directs flow of the coolant to the engine.

Additionally, first, second, third, and fourth temperature sensors respectively measure an outlet coolant temperature of the engine, an inlet coolant temperature of the HEH, an inlet temperature of the air to the heater core, and an outlet temperature of the air from the heater core. A controller of the system is in communication with the sensors and programmed to calculate a target coolant temperature as a function of the inlet air temperature, outlet air temperature, and mass flow rates of the air and coolant, and to control the CHV such that the CHV is switched between the Engine Bypass position and the Engine Link position only when the inlet coolant temperature (ICT) equals the calculated target coolant temperature (TCT) value. In this manner, the controller balances cabin heating demand and waste heat utilization of the engine while avoiding the puff of air phenomenon noted above.

A method is also disclosed for the system noted above. The method includes receiving, via a controller, the engine outlet coolant temperature (ECT), inlet coolant temperature (ICT) to the HEH, inlet temperature of the air into the heater core, and outlet temperature of the air from the heater core from the respective first, second, third, and fourth temperature sensors. The method also includes calculating a target coolant temperature (TCT) value as a function of the received inlet air temperature, the outlet air temperature, and mass flow rates of the air and the coolant, and controlling the CHV using the controller such that the CHV is switched between the Engine Bypass position and the Engine Link position only when the inlet coolant temperature (ICT) equals the calculated target coolant temperature (TCT) value.

A vehicle is also disclosed that includes an internal combustion engine, a radiator in fluid communication with the engine via an engine coolant loop, and the thermal management system noted above.

The above features and other advantages and features of the present disclosure are readily apparent from the following detailed description when taken in connection with the accompanying drawings.

BRIEF DESCRIPTION OF THE DRAWINGS

FIGS. 3A-D are time plots describing the method in terms of its effect on coolant temperature, engine speed, CHV position control, and HEH power, respectively.

DETAILED DESCRIPTION

Figure 1:
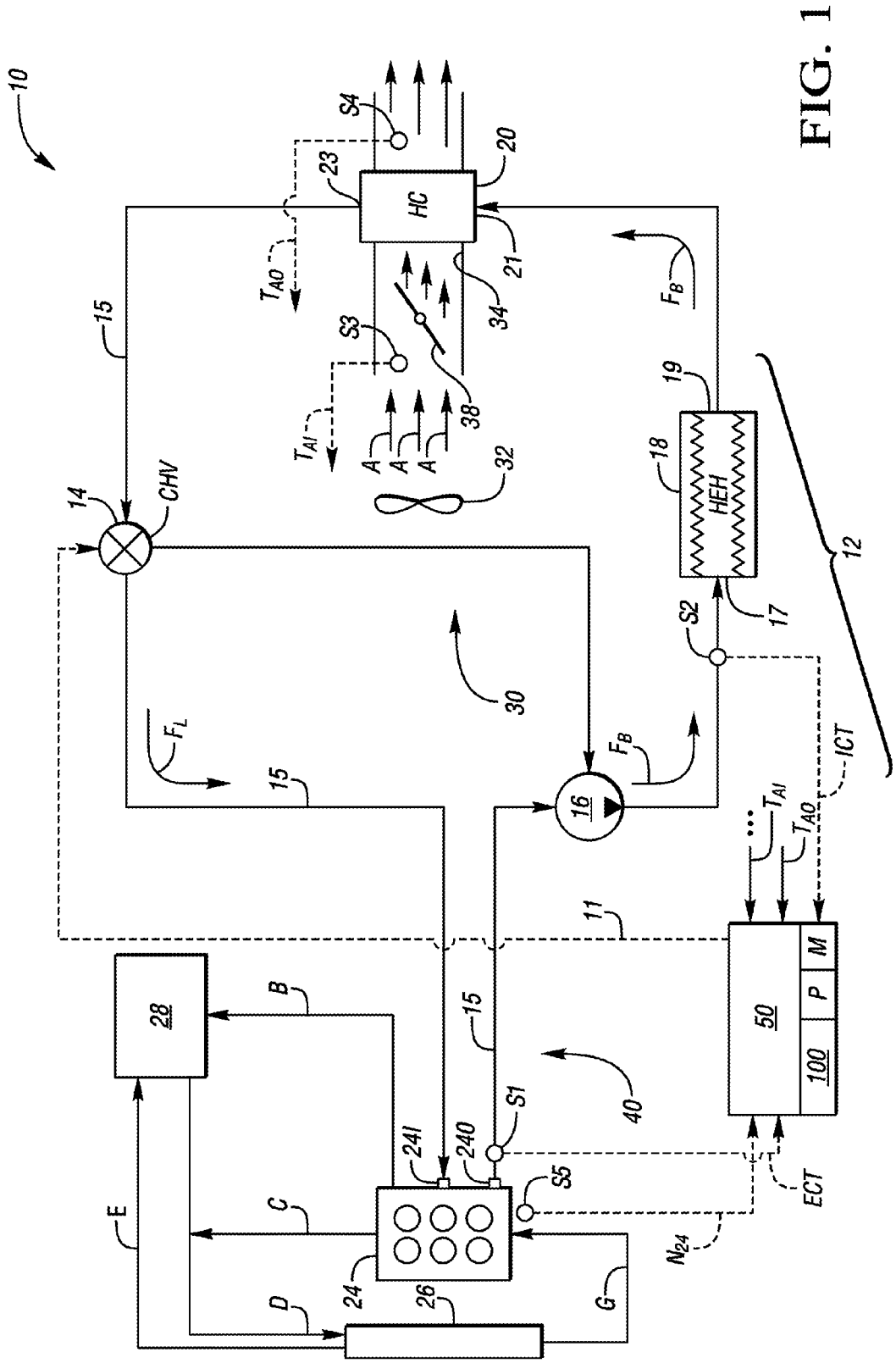
FIG. 1 is a schematic illustration of a portion of an example vehicle having a hybrid thermal management system that includes a cabin heater valve (CHV) and a controller programmed to control the position of the CHV as disclosed herein.

Referring to the drawings, wherein like reference numerals refer to the same structure throughout the various Figures, an example vehicle 10 is shown schematically in FIG. 1. The vehicle 10 may be embodied variously as a hybrid electric vehicle, an extended-range electric vehicle, or any other vehicle having an internal combustion engine 24 and a hybrid thermal management system 12 with a cabin heater valve (CHV) 14 of the type described generally above. The thermal management system 12 includes a controller 50 that is programmed to execute steps of a method 100 to thereby control the position of the CHV 14 between an Engine Link mode and an Engine Bypass mode in an optimal manner.

In addition to the CHV 14, the thermal management system 12 includes a coolant pump 16, a high-voltage electric heater (HEH) 18 operable for heating such coolant and having a respective coolant inlet 17 and coolant outlet 19, and a cabin heater core 20 having a coolant inlet 21 and a coolant outlet 23. The pump 16, HEH 18, heater core 20, and CHV 14 are in fluid communication with each other via suitable fluid conduit 15, e.g., hoses, fittings, and the like. Coolant is circulated by the coolant pump 16 through the HEH 18, to the cabin heater core (HC) 20, and to the CHV 14 in one of two coolant loops, i.e., an Engine Bypass Loop 30 and an Engine Link Loop 40. The position of the CHV 14 is determined by the controller 50 and commanded via position control signals (arrow 11) according to the steps of the method 100, an example of which is described below with reference to FIGS. 2A-B. Effects of the method 100 on operation of the vehicle 10 are described with further reference to FIGS. 3A-D.

The Engine Link Loop 40 of FIG. 1 includes the engine 24, a radiator 26, and a surge tank 28. In Engine Link mode, the engine 24 receives coolant via an engine coolant inlet 24I after the coolant has been discharged from the CHV 14 in the Engine Link position. Operation of the engine 24 ultimately heats the coolant and discharges it to the radiator 26 via a flow path C and, as needed, to the surge tank 28 via a separate flow path B. The radiator 26 may likewise discharge excess coolant to the surge tank 28 via a flow path E. Outflow from the surge tank 28 passes to the radiator 26 via flow path D. Coolant exiting the radiator 26 via a flow path G re-enters the engine 24 and is ultimately discharged via an engine coolant outlet 24O, where the discharged coolant is drawn back into the coolant pump 16.

The CHV 14 may be configured as a three-way valve having two distinct control positions: an Engine Link position and an Engine Bypass position, each of which corresponds to one of the two modes described above. In the Engine Link mode, the CHV 14 directs coolant flowing out of the cabin heater core 20 to the engine 24 as indicated by flow arrow $F_L$. In the Engine Bypass mode, the CHV 14 changes its position in response to receipt of the position control signals (arrow 11) from the controller 50 so that outflow of coolant from the CHV 14 passes to the coolant pump 16 in the direction of flow arrow $F_B$. Coolant flowing in the Bypass Loop 30 is thereafter heated by the HEH 18 as needed before the heated coolant flows to the cabin heater core 20. Additionally, air (arrows A) is circulated by a blower 32 and passes through an air duct 34 across the heater core 20, with the air duct 34 selectively opened and closed via position control of a heater flap 38 as is well known in the art.

The controller 50 of FIG. 1 may be embodied as a digital computer having a processor (P) and memory (M), i.e., sufficient tangible, non-transitory memory such as read only memory, flash memory, and/or other magnetic or optical storage media. The controller 50 also includes sufficient random access memory, electrically-erasable programmable read only memory, and the like. Additionally, the controller 50 may include a high-speed clock, analog-to-digital and digital-to-analog circuitry, and input/output circuitry and devices, as well as appropriate signal conditioning and buffer circuitry to provide a fully functional hardware and software control device.

Additionally, the controller 50 uses various pieces of data in the overall control of the CHV 14. For instance, temperature data is measured at various locations within the thermal management system 12, including an engine coolant outlet temperature (arrow ECT) measured by a first temperature sensor S1 and an HEH inlet coolant temperature (arrow ICT) from a second temperature sensor S2, as well as air inlet and outlet temperatures (arrows $T_{AI}$, $T_{AO}$) from corresponding third and fourth temperature sensors S3 and S4. Engine speed (arrow $N_{24}$) may be reported via an engine control module (not shown) or measured via an optional speed sensor S5.

The controller 50 may be programmed to determine if a propulsion system of vehicle 10 is active, and if so, to default to the Engine Bypass mode for about 1 minute or another suitable amount of time before further moves are permitted. The functions of the controller 50 may be implemented or assisted using a state machine, as is known in the art. Outside of the state machine, a timer may be optionally employed to monitor and ultimately limit excessive position requests if the number of position requests over a key cycle exceeds a calibrated threshold.

It is recognized herein as a basis of the disclosed design that conventional methods of controlling cabin heating valves such as the example CHV 14 of FIG. 1 tend to ignore or avoid energy balance between engine waste heat and any HEH-provided heat. This omission may lead to errant valve positioning. For instance, in the example design of FIG. 1 and using conventional control methods, the CHV 14 may be commanded to the Engine Bypass position while waste heat energy remains available for use in the Engine Link Loop 40. Similarly, the Engine Link mode may be selected when the HEH 18 is operating at or near its capacity, thereby causing the HEH 18 to effectively act, undesirably, as an engine block heater. The method 100 thus attempts to improve upon such positioning methods, reduce instances of flutter/oscillation and associated wear of the CHV 14, and avoid the hot/cold puff of air phenomenon noted elsewhere above.

Figure 2A:
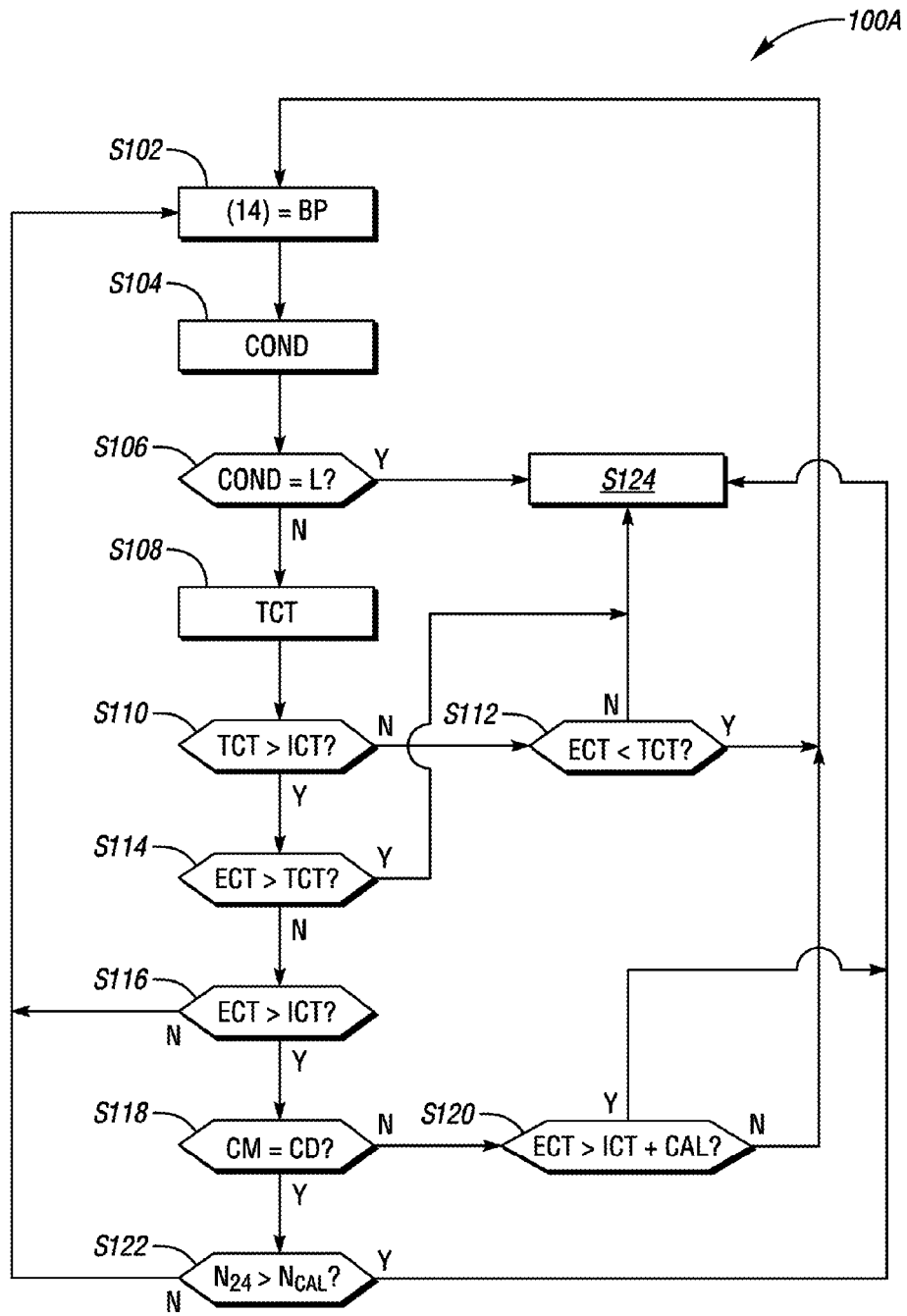
FIGS. 2A and 2B together provide a flow chart describing an example method for controlling the CHV shown in FIG. 1.
Figure 2B:
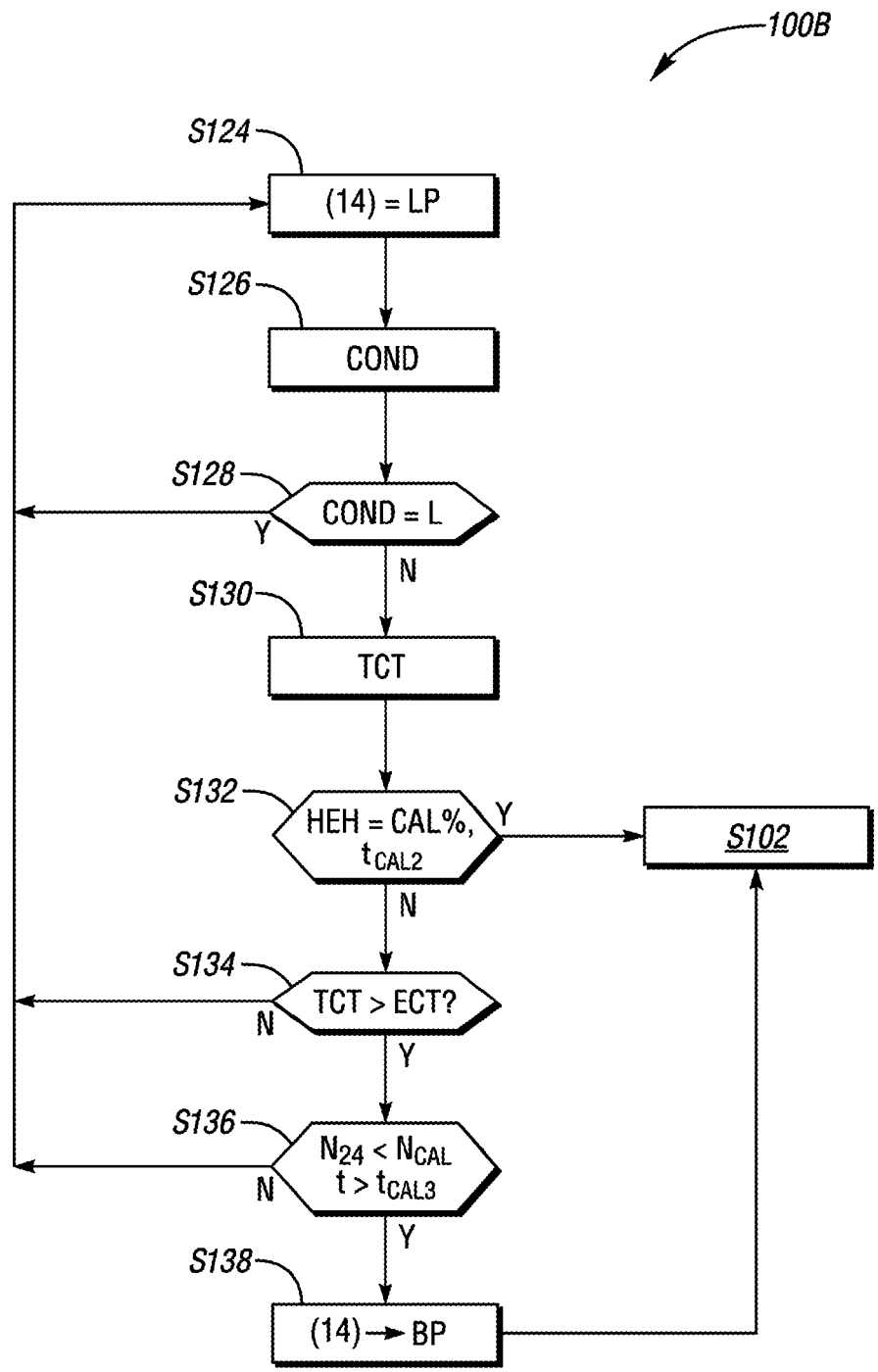

Referring to FIGS. 2A and 2B, execution of the method 100 allows a calculated target value for the outlet coolant temperature of the cabin heater core 20 of FIG. 1, hereinafter referred to as the Target Coolant Temperature (TCT), to be determined using the actual cabin heating demand, with the calculated TCT value being a function of the required discharge air temperature from the air duct 34, as well as the mass flow rate of coolant and air flowing through or across the heater core 20. The TCT value is used along with engine outlet coolant temperature (arrow ECT of FIG. 1) from the first temperature sensor S1, the inlet coolant temperature to the HEH 18 (arrow ICT of FIG. 1) from the second temperature sensor S2, calculated or measured mass flow rates of the coolant and air, and the known or measured position of the heater flap 38 to solve for the energy balance between waste heat energy from the engine 24 and available electric power from the HEH 18.

FIG. 2A describes the control process of movement from an Engine Bypass position to an Engine Link position, with the opposite action described via the steps of FIG. 2B. FIGS. 2A and 2B thus depict different portions of the same method 100, i.e., method portions 100A and 100B of FIGS. 2A and 2B describe a single method 100. Commencing at step S102, the controller 50 of FIG. 1 commands a change to the Engine Bypass (BP) mode via transmission of position switching control signals (arrow 11 of FIG. 1). The method 100 then proceeds to step S104, wherein the controller 50 receives or otherwise determines values or statuses for a set of predetermined priority conditions individually or collectively indicative of a need to transition the CHV 14 to the Engine Link position. Non-limiting example conditions may include a detected electrical fault in the HEH 18 or another electrical component of the system 20, a predetermined priority climate control mode such as via a passenger's selection of a mode in which cabin climate control is prioritized over powertrain energy efficiency, a threshold number of cycles of the CHV 14, or the like. The method 100 proceeds to step S106 when these values have been determined.

At step S106, the controller 50 next determines if the values from step S104 satisfy the predetermined priority conditions, such as by comparing the values to calibrated thresholds or expected results. The method 100 proceeds to execute Engine Link (L) mode at step S124 if such conditions are satisfied. Otherwise, the controller 50 proceeds to step S108 while remaining in Engine Bypass mode.

Step S108 entails calculating the target outlet coolant temperature value of the heater core 20, i.e., a TCT value, via the controller 50. The following formula may be used to solve for the target value (TCT):

$$TCT = \left(T_{IA} + \frac{T_{OA} - T_{IA}}{\varepsilon}\right) - \frac{(\dot{m}c_p)a}{(\dot{m}c_p)c}(T_{OA} - T_{IA})$$

where $T_{IA}$ and $T_{OA}$ are the measured inlet and outlet air temperatures from third and fourth sensors S3 and S4, respectively, $\varepsilon$ is the known efficiency of the heater core 20, $\dot{m}$ is the mass flow rate of air (a) or coolant (c), and $\dot{m}c_p$ is the heat capacity rate. The mass flow rate of air may be determined by direct measurement, e.g., using a flow meter, or it more commonly may be calculated as a function of heater flap position and a measured or reported speed of the blower 32 of FIG. 1, as is known in the art. The method 100 proceeds to step S110 when the controller 50 finishes calculating the TCT value.

Step S110 includes comparing the TCT value from step S108 to the HEH inlet coolant temperature (arrow ICT of FIG. 1). In Engine Bypass mode, the position of the CHV 14 effectively closes a loop on the heater core 20 by bypassing the engine 24. The coolant outlet of the heater core 20 is thus connected to the coolant inlet of the HEH 18 as shown in FIG. 1. Therefore, the HEH inlet coolant temperature (ICT) is effectively equal to the coolant outlet temperature of the heater core 20, with the controller 50 designed to control the ICT so that it closely matches the calculated TCT value during the Engine Bypass mode as can be seen when viewing FIGS. 3A and 3C together. Step S112 is executed if the calculated TCT value does not exceed the HEH inlet coolant temperature (ICT) at step S110. Step S114 is executed in the alternative if the calculated TCT value exceeds the ICT value, which indicates a need for coolant heating via the HEH 18.

At step S112, the controller 50 determines whether the engine outlet coolant temperature (arrow ECT) measured by the first temperature sensor S1 is less than the calculated TCT value. If so, the controller 50 returns to step S102 and remains in the Engine Bypass mode. Otherwise, the controller 50 proceeds to step S124 and transitions to Engine Link mode.

Step S114 includes determining whether the engine outlet coolant temperature (arrow ECT) exceeds the calculated TCT value. If so, the controller 50 proceeds to step S124 and transitions to Engine Link mode. Otherwise, the controller 50 proceeds to step S116, as this result indicates that engine waste heat is insufficient for cabin heating.

At step S116, the controller 50 determines whether engine outlet coolant temperature (ECT) exceeds the inlet coolant temperature (ICT) to the heater core 20. If not, the method 100 repeats step S102. However, the method 100 proceeds to step S118 when ECT exceeds ICT.

At step 118 the controller 50 determines if a predetermined heating, ventilation, and air conditioning (HVAC) priority mode has been commanded, e.g., a comfort mode as represented in FIG. 2A as CM=CD. Such a mode as noted above may be used by a passenger in some vehicle designs to request that passenger comfort or fan speed take priority over fuel economy. The method 100 proceeds to step S120 if such a mode is not selected. Step S122 is executed in the alternative if the mode is selected.

Step S120 includes comparing engine outlet coolant temperature (arrow ECT) to the HEH inlet coolant temperature (ICT) to determine if the ECT value exceeds the ICT value by a calibrated amount (CAL) over a calibrated duration ($t_{CAL}$). If so, the method 100 proceeds to step S124. Otherwise, step S102 is repeated and the system remains in Engine Bypass mode.

Step S122 includes comparing engine speed (arrow $N_{24}$ of FIG. 1) to a calibrated threshold engine speed ($N_{CAL}$), e.g., about 500 RPM-700 RPM. The thermal management system 20 remains in Engine Bypass mode for as long as the engine speed (arrow $N_{24}$) does not exceed this threshold. Step S124 is executed to transition to Engine Link mode when, at this point of the method 100, engine speed exceeds the calibrated threshold.

FIG. 2B depicts the various steps used in transitioning from Engine Link mode to Engine Bypass mode. Engine Link mode connects the engine coolant outlet 240 of FIG. 1 to the HEH 18, and thus the ICT value measured by temperature sensor S2 should be substantially equal to the engine outlet coolant temperature (arrow ECT). HEH operation is temporary while the engine 24 remains connected to the heater core 20. However, the controller 50 still ensures that electric energy output of the HEH 18 does not bleed into the engine link loop (arrow 40).

If the engine 24 is not warming up, i.e., if engine speed (arrow $N_{24}$) remains below the calibrated threshold ($N_{CAL}$) for a predetermined duration such as 10 seconds, and if the calculated TCT exceeds the engine outlet coolant temperature (arrow ECT) or the measured inlet coolant temperature (arrow ICT) of the HEH 18, the Engine Bypass position is commanded by the controller 50 to avoid bleeding heat from the HEH 18 into the engine 24, and also to speed up cabin heating. On the other hand, if the calculated TCT value exceeds the engine outlet coolant temperature (arrow ECT) or inlet coolant temperature (arrow ICT) of the HEH 18 and the engine 24 is warming up, operation of the HEH 18 can be controlled in tandem with engine waste heat so as to speed up cabin heating. Control of the HEH 18 may be terminated when the calculated TCT does not exceed the measured coolant inlet temperature (arrow ICT) of the HEH 18 so as to conserve energy.

Step S124 includes positioning the CHV 14 of FIG. 1 to the Engine Link position, abbreviated (14)=LP in FIG. 2B for "link position", e.g., via transmission of corresponding switching control signals (arrow 11) to the CHV 14. Once the position of the CHV 14 has switched, the method 100 proceeds to step S126 wherein the controller 50 receives values for the various priority conditions in a step analogous to step S104 of FIG. 2A. If at step S128 the link (L) conditions warrant remaining in Engine Link mode, the controller 50 repeats step S124. Otherwise, the method 100 proceeds to step S130.

At step S130 the controller 50 calculates the target outlet coolant temperature (TCT) as set forth above in step S108, then proceeds to step S132 wherein the controller 50 next determines if the HEH 18 has been operating at a calibrated percentage (CAL %) of capacity for a calibrated amount of time ($t_{CAL2}$). This enables a conservative move of the CHV 14 from Engine Link mode to Engine Bypass mode if heavy operation of the HEH 18 is detected, e.g., a percentage power load in excess of a predetermined threshold such as 75-85%, and is observed for a sufficient duration, for instance 2 minutes. If so, the method 100 proceeds to step S102 wherein the CHV 14 is switched to the Engine Bypass position. Otherwise, the method 100 proceeds to step S134.

At step S134 the calculated TCT value is compared to the engine outlet coolant temperature (arrow ECT). Step S124 is executed if the calculated TCT exceeds the engine outlet coolant temperature (ECT), with step S136 executed in the alternative. In other words, while in Engine Link mode, if TCT is less than the engine outlet coolant temperature, the controller 50 is aware that engine waste heat is sufficient for cabin heating purposes.

Step S136 entails comparing engine speed (arrow $N_{24}$) to speed and time thresholds ($N_{CAL}$, $t_{CAL3}$) in a step analogous to step S120 of FIG. 2A. Step S124 is executed, i.e., the system remains in Engine Link mode, if the engine 24 is still warming up, e.g., remains below the speed threshold for the calibrated amount of time. Step S138 is executed in the alternative. Thus, if TCT exceeds the engine outlet coolant temperature (ECT) at step S134 and engine speed is relatively high at step S136, the controller 50 makes a determination that it is most efficient to remain in Engine Link mode.

At step S138, the controller 50 of FIG. 1 commands the CHV 14 to switch to the Engine Bypass position, abbreviated "BP" in FIG. 2B for "bypass", again via transmission of the switching control signals (arrow 11) to the CHV 14. The method 100 thereafter returns to step S102.

FIGS. 3A-D are time plots which collectively illustrate the effects of the method 100 on the performance of various components of the vehicle 10 shown in FIG. 1. FIG. 3A includes a set of traces 60 describing coolant temperature effects, with coolant temperature $T_C$ plotted on the vertical axis and time (t), in each of FIGS. 3A-D, plotted on the horizontal axis. Trace 62 is the calculated TCT, which is the target coolant temperature value calculated as set forth above. Trace 64 is the engine outlet coolant temperature (ECT), while traces 66 and 68 respectively depict the ICT value controlled per the method 100 and the ICT value determined using conventional means. In zone 65, the gap between traces 66 and 68 is indicative of insufficient heating of the coolant by the HEH 18, with an extended delay experienced until trace 64 (ECT) matches trace 68, i.e., the conventional ICT value. As can be seen from FIGS. 3A and 3C in particular, the CHV 14 is switched from the Engine Bypass position to the Engine Link position when the inlet coolant temperature (ICT) equals the calculated target coolant temperature (TCT) value to eliminate the warm puff of air phenomenon.

FIG. 3B depicts engine speed ($N_{24}$) on the vertical axis, with trace 76 being the engine speed in RPM as experienced using the method 100 and trace 78 representing engine speed using conventional means. Zone 75 illustrates that upon changing the CHV position to Engine Link after initial warm-up of the HEH 18, the engine 24 may be allowed to run harder, i.e., above a nominal speed, so as to increase the state of charge (SOC) of any onboard high-voltage energy storage system while maintaining coolant temperature. Zone 77 indicates that the high SOC and improved closed-loop control allows for prolonged engine-off durations, as the required heat is obtained from the HEH 18 during low-speed operation. Zone 79 illustrates a potential benefit relative to conventional methods in which the engine 24 idles during up-hill drives. With the method 100 in place, and with SOC at a balanced level, the engine 24 may be turned on while the vehicle 10 accelerates and turned off when the vehicle 10 is coasting, with this decision made as a function of the engine coolant temperature (ECT). In such a case, operation of the HEH 18 may be controlled so that any cabin heating demand is met and electrical energy from the HEH 18 does not bleed into the engine block.

FIG. 3C depicts the differences in position control between conventional CHV control methods (trace 88) and the method 100 (trace 86). Trace 88 retains the CHV 14 in Engine Link mode while the HEH 18 is running with a limited power output. However, the present method 100 recognizes that Engine Link position with the HEH 18 running may result in the HEH 18 heating the engine block rather than cabin heating. Method 100 changes this approach by using the Engine Link mode when the engine 24 is running, and the HEH 18 in conjunction with Engine Bypass when state of charge (SOC) is sufficiently high, therefore allowing the engine 24 to remain off for longer durations.

FIG. 3D describes the power output capacity of the HEH 18. Trace 96 represents available power from the HEH 18 under the method 100, which is contrasted with using conventional methods (trace 98). Zone 95 indicates the situation of driving with the engine 24 turned off and the HEH 18 turned on allows utilization of some of a high-voltage charge accumulated during initial warm-up of the engine 24.

The method 100 as described above thus ensures that vehicle cabin heating demand in certain types of hybrid vehicles is quickly restored, and that the position of the CHV 14 is changed in an optimal manner from an Engine Bypass position to an Engine Link position whenever the engine outlet coolant temperature (arrow ECT) falls within an acceptable range of measured ICT, e.g., within about ±5%. This essentially avoids any large changes in coolant temperature at the heater core 18 and, as a result, any undesirable warm/cold puffs of air emitting from the air duct 34 of FIG. 1. Thus, engine waste heat and HEH-provided heat are carefully balanced when automatically selecting between the Engine Link position and the Engine Bypass position of the CHV 14.

While the best modes for carrying out the presently disclosed system and method have been described in detail, those familiar with the art to which this disclosure relates will recognize various alternative designs and embodiments may exist within the scope of the appended claims.

The invention claimed is:

1. A thermal management system for a vehicle having an engine, the thermal management system comprising:
   a pump operable for circulating coolant;
   a high-voltage electric heater (HEH) in fluid communication with the pump, operable for heating the coolant, and having a coolant outlet;
   a heater core having a coolant inlet in fluid communication with the coolant outlet of the HEH;
   a blower which directs air to the heater core;
   a three-way cabin heater valve (CHV) responsive to position control signals and having an Engine Bypass position which blocks a flow of the coolant from the HEH into the engine, and an Engine Link position which directs the flow of the coolant from the HEH into the engine;
   first, second, third, and fourth temperature sensors which respectively measure an engine outlet coolant temperature (ECT), an inlet coolant temperature (ICT) to the HEH, an inlet temperature of the air into the heater core, and an outlet temperature of the air from the heater core; and
   a controller in communication with the temperature sensors and programmed to calculate a target coolant temperature (TCT) value as a function of the inlet air temperature, the outlet air temperature, and mass flow rates of the air and the coolant, and to control the CHV via the position control signals such that the CHV is switched between the Engine Link position and the Engine Bypass position when the inlet coolant temperature (ICT) equals the calculated target coolant temperature (TCT) value, thereby balancing cabin heating demand and waste heat utilization of the engine.

2. The system of claim 1, wherein the function is:

$$TCT = \left(T_{IA} + \frac{T_{OA} - T_{IA}}{\varepsilon}\right) - \frac{(\dot{m}c_p)a}{(\dot{m}c_p)c}(T_{OA} - T_{IA})$$

and wherein $T_{IA}$ and $T_{OA}$ are the outlet and inlet air temperatures, respectively, $\varepsilon$ is the efficiency of the heater core, and $(\dot{m}c_p)$a and $(\dot{m}c_p)$c are the heat capacity rates of air and coolant, respectively.

3. The system of claim 1, wherein the controller is programmed to maintain the Engine Bypass position when the calculated target coolant temperature (TCT) value and the engine outlet coolant temperature (ECT) do not exceed the inlet coolant temperature (ICT) to the HEH.

4. The system of claim 1, wherein the controller is programmed to command the CHV to the Engine Link position when the calculated target coolant temperature (TCT) value exceeds the inlet coolant temperature (ICT) and the engine outlet coolant temperature (ECT) exceeds the calculated target coolant temperature (TCT) value.

5. The system of claim 1, wherein the controller is programmed to command the CHV to the Engine Link position in response to a selected mode prioritizing cabin heating of the vehicle when the calculated target coolant temperature (TCT) value exceeds the inlet coolant temperature (ICT), the engine outlet coolant temperature (ECT) exceeds the inlet coolant temperature (ICT) and does not exceed the calculated target coolant temperature (TCT) value, and a speed of the engine exceeds a calibrated engine speed.

6. The system of claim 1, wherein the controller is programmed to command the CHV from the Engine Link position to the Engine Bypass position if the HEH is running above a calibrated power threshold for a calibrated duration.

7. The system of claim 1, wherein the controller is programmed to command the CHV from the Engine Link position to the Engine Bypass position if the HEH is running below a calibrated power threshold, calculated target coolant temperature (TCT) value exceeds the engine outlet coolant temperature (ECT), and a speed of the engine is below a calibrated engine speed.

8. A method for use in a thermal management system for a vehicle having an engine, the thermal management system including a coolant pump, a high-voltage electric heater (HEH) in fluid communication with the coolant pump, a heater core in fluid communication with the HEH, a blower which directs air to the heater core, a three-way cabin heater valve (CHV) responsive to position control signals and having an Engine Bypass position which blocks a flow of the coolant from the HEH into the engine, and an Engine Link position which directs the flow of the coolant from the HEH into the engine, first, second, third, and fourth temperature sensors, and a controller, the method comprising:
   receiving an engine outlet coolant temperature (ECT), an inlet coolant temperature (ICT) to the HEH, an inlet temperature of the air into the heater core, and an outlet temperature of the air from the heater core from the respective first, second, third, and fourth temperature sensors;
   calculating a target coolant temperature (TCT) value as a function of the received inlet air temperature, the outlet air temperature, and mass flow rates of the air and the coolant; and
   controlling a three-way cabin heater valve (CHV) having an Engine Bypass position which blocks a flow of the coolant into the engine from a high-voltage electric heater (HEH), and an Engine Link position which directs the flow of the coolant from the HEH into the engine, via position control signals from a controller such that the CHV is switched between the Engine Link position and the Engine Bypass position when the inlet coolant temperature (ICT) equals the calculated target coolant temperature (TCT) value, thereby balancing cabin heating demand and waste heat utilization of the engine.

9. The method of claim 8, wherein the function is:

$$TCT = \left(T_{IA} + \frac{T_{OA} - T_{IA}}{\varepsilon}\right) - \frac{(\dot{m}c_p)a}{(\dot{m}c_p)c}(T_{OA} - T_{IA})$$

and wherein $T_{IA}$ and $T_{OA}$ are the outlet and inlet air temperatures, respectively, $\varepsilon$ is the efficiency of the heater core, and $(\dot{m}c_p)$ a and $(\dot{m}c_p)$ c are the heat capacity rates of air and coolant, respectively.

10. The method of claim 8, further comprising: maintaining the Engine Bypass position via the controller when the calculated target coolant temperature (TCT) value and the engine outlet coolant temperature (ECT) do not exceed the inlet coolant temperature (ICT) to the HEH.

11. The method of claim 8, further comprising: commanding the CHV to achieve the Engine Link position, via transmission of the position control signals by the controller, when the calculated target coolant temperature (TCT) value exceeds the inlet coolant temperature (ICT) and the engine outlet coolant temperature (ECT) exceeds the calculated target coolant temperature (TCT) value.

12. The method of claim 8, further comprising: commanding the CHV to the Engine Link position, via transmission of the position control signals by the controller, in response to a selected mode prioritizing cabin heating of the vehicle when the calculated target coolant temperature (TCT) value exceeds the inlet coolant temperature (ICT), the engine outlet coolant temperature (ECT) exceeds the inlet coolant temperature (ICT) and does not exceed the calculated target coolant temperature (TCT) value, and a speed of the engine exceeds a calibrated speed.

13. The method of claim 8, further comprising: commanding the CHV from the Engine Link position to the Engine Bypass position, via transmission of the position control signals by the controller, if the HEH is running above a calibrated power threshold for a calibrated duration.

14. The method of claim 8, further comprising: commanding the CHV to transition from the Engine Link position to the Engine Bypass position, via transmission of the position control signals by the controller, if the HEH is running below a calibrated power threshold, the calculated target coolant temperature (TCT) value exceeds the engine outlet coolant temperature (ECT), and a speed of the engine is below a calibrated engine speed.

15. A vehicle comprising:
   an internal combustion engine;
   a radiator in fluid communication with the engine via an engine coolant loop; and
   a thermal management system including:
      a pump operable for circulating coolant;
      a high-voltage electric heater (HEH) having a coolant inlet in fluid communication with the pump, operable for heating the coolant, and having a coolant outlet;
      a heater core having a coolant inlet in fluid communication with the coolant outlet of the HEH;
      a blower which directs air to the heater core;
      a three-way cabin heater valve (CHV) responsive to position control signals and having an Engine Bypass position which blocks a flow of the coolant from the HEH into the engine coolant loop, and an Engine Link position which directs the flow of the coolant from the HEH into the engine coolant loop;
      first, second, third, and fourth temperature sensors which respectively measure an engine outlet coolant temperature (ECT), an inlet coolant temperature (ICT) to the HEH, an inlet temperature of the air into the heater core, and an outlet temperature of the air from the heater core; and
      a controller in communication with the temperature sensors and programmed to calculate a target coolant temperature (TCT) value as a function of the inlet air temperature, the outlet air temperature, and mass flow rates of the air and the coolant, and to control the CHV via the position control signals such that the CHV is switched to the Engine Link position when the inlet coolant temperature (ICT) equals the calculated target coolant temperature (TCT) value, thereby balancing cabin heating demand and waste heat utilization of the engine.

16. The vehicle of claim 15, wherein the function is:

$$TCT = \left(T_{IA} + \frac{T_{OA} - T_{IA}}{\varepsilon}\right) - \frac{(\dot{m}c_p)a}{(\dot{m}c_p)c}(T_{OA} - T_{IA})$$

and wherein $T_{IA}$ and $T_{OA}$ are the outlet and inlet air temperatures, respectively, $\varepsilon$ is the efficiency of the heater core, and $(\dot{m}c_p)$ a and $(\dot{m}c_p)$ c are the heat capacity rates of air and coolant, respectively.

17. The vehicle of claim 15, wherein the controller is programmed to command the CHV from the Engine Link position to the Engine Bypass position if the HEH is running above a calibrated power threshold for a calibrated duration.

18. The vehicle of claim 15, wherein the controller is programmed to command the CHV from the Engine Link position to the Engine Bypass position if the HEH is running below a calibrated power threshold, the calculated target coolant temperature (TCT) value exceeds the engine outlet coolant temperature (ECT), and a speed of the engine is below a calibrated engine speed.

* * * * *